United States Patent
Bottasso

(10) Patent No.: US 10,882,609 B2
(45) Date of Patent: Jan. 5, 2021

(54) VIBRATION DAMPING DEVICE AND DAMPING METHOD FOR A ROTOR OF AN AIRCRAFT CAPABLE OF HOVERING

(71) Applicant: LEONARDO S.P.A., Rome (IT)

(72) Inventor: Luigi Maria Bottasso, Samarate (IT)

(73) Assignee: LEONARDO S.P.A., Rome (IT)

(*) Notice: Subject to any disclaimer, the term of this patent is extended or adjusted under 35 U.S.C. 154(b) by 164 days.

(21) Appl. No.: 16/076,557

(22) PCT Filed: Feb. 22, 2017

(86) PCT No.: PCT/IB2017/051015
§ 371 (c)(1),
(2) Date: Aug. 8, 2018

(87) PCT Pub. No.: WO2017/145073
PCT Pub. Date: Aug. 31, 2017

(65) Prior Publication Data
US 2019/0047690 A1    Feb. 14, 2019

(30) Foreign Application Priority Data
Feb. 22, 2016    (EP) .................................... 16156780

(51) Int. Cl.
*B64C 27/00*    (2006.01)
*B64C 27/04*    (2006.01)
(Continued)

(52) U.S. Cl.
CPC ............ *B64C 27/001* (2013.01); *F16F 15/02* (2013.01); *F16F 15/1457* (2013.01);
(Continued)

(58) Field of Classification Search
CPC ............ B64C 27/001; B64C 2027/003; B64C 2027/004; B64C 2027/005; B64C 27/51; Y10S 416/50; Y10T 464/50; F16F 15/145; F16F 15/02; F16F 15/1457; F16F 2228/04; F16F 2230/0005; F16F 2232/02;
(Continued)

(56) References Cited

U.S. PATENT DOCUMENTS 6,045,090 A * 4/2000 Krysinsky ............. B64C 27/001
188/378

FOREIGN PATENT DOCUMENTS

| EP | 1 035 015 | 9/2000 |
| EP | 1 528 281 | 5/2005 |

(Continued)

*Primary Examiner* — Courtney D Heinle
*Assistant Examiner* — Eric J Zamora Alvarez
(74) *Attorney, Agent, or Firm* — Leason Ellis LLP

(57) ABSTRACT

A damping device is described that is designed to counter the transmission of vibrations to a further element and comprises: a beam element, which extends mainly parallel to an axis, is constrained to the further element and is designed to flexurally oscillate, in use, in a plane parallel to the axis to counter the transmission of vibrations to the further element; an actuator, which comprises a transmission element operatively connected to the beam element and extending mainly along the axis; the actuator being controllable to apply a direct tensile or compressive load along the axis on the transmission element that is variable according to the frequency of the vibrations to be dampened.

13 Claims, 5 Drawing Sheets

(51) Int. Cl.
  *F16F 7/10*   (2006.01)
  *F16F 15/02*  (2006.01)
  *F16F 15/14*  (2006.01)

(52) U.S. Cl.
  CPC .. *B64C 2027/003* (2013.01); *B64C 2027/004* (2013.01); *F16F 2228/04* (2013.01); *F16F 2230/0005* (2013.01); *F16F 2232/02* (2013.01); *F16F 2236/04* (2013.01); *F16F 2236/06* (2013.01); *F16F 2238/04* (2013.01)

(58) Field of Classification Search
  CPC ............... F16F 2236/04; F16F 2236/06; F16F 2238/04; F01D 5/02; F01D 25/04
  See application file for complete search history.

(56) References Cited

FOREIGN PATENT DOCUMENTS

| | | |
|---|---|---|
| EP | 1528851 | 5/2005 |
| EP | 2 857 313 | 12/2015 |
| FR | 2749901 | 12/1997 |
| GB | 2014099 | 8/1979 |
| WO | WO 2008/155632 | 12/2008 |

\* cited by examiner

VIBRATION DAMPING DEVICE AND DAMPING METHOD FOR A ROTOR OF AN AIRCRAFT CAPABLE OF HOVERING

CROSS-REFERENCE TO RELATED PATENT APPLICATIONS

This application is a U.S. National Phase Application under 35 U.S.C. § 371 of International Patent Application No. PCT/IB2017/051015, filed Feb. 22, 2017, which claims the priority of European Application No. 16156780.5, filed Feb. 22, 2016, which is incorporated by reference as if expressly set forth in its entirety herein.

TECHNICAL FIELD

The present invention concerns a vibration damping device and a vibration damping method for a rotor of an aircraft capable of hovering.

Although this description refers to a helicopter application, the damping device could be applied to any other apparatus, for example a machine tool, a boat or land vehicle, having a source of vibration and an area that it is wished to insulate, as far as possible, from this source of vibration.

BACKGROUND ART

Known helicopters basically comprise a fuselage, a main rotor positioned on the top of the fuselage and rotatable about its axis, and a tail rotor located at the rear end of the fuselage. Known types of helicopters also comprise a pair of horizontal tail surfaces and a pair of vertical tail surfaces.

In greater detail, the rotor, in turn, basically comprises a hub rotatable about the above-mentioned axis and equipped with a plurality of blades radially fastened in a cantilever manner to the above-mentioned hub, and a mast that can be connected to gearing and thus to a drive member operatively connected to the hub to drive it in rotation.

The rotation of the blades at high angular speeds causes, in use, the generation of vibrational stress both on the plane of the rotor and perpendicularly to it; this stress is transmitted to the mast and, in consequence, to the helicopter.

In order to curb the transmission of these vibrations, usually those lying on the plane of the rotor, to the mast of the rotor, it is known to use damping devices carried by the rotor and usually tuned to a particular frequency of the above-mentioned vibrations.

Examples of these damping devices are described in Patent Applications GB-A-2014099 and FR-A-2749901.

In addition, Patent Application WO2008IB01594, in the name of the Applicant, describes a damping device capable of curbing the generation and transmission of these vibrations to the drive shaft of the rotor in a simple and inexpensive manner, without interfering with the aerodynamics and functioning of the rotor.

More precisely, the above-mentioned damping device basically comprises:

- a mass;
- a rod, which is coaxially supported at its first axial end by the shaft and is connected to the mass at its second axial end, opposite to the first end.

More precisely, the axial stiffness of the rod is sufficiently high to constrain the mass in a substantially fixed position along the axis of the rotor.

Otherwise, the flexural rigidity of the rod is such as to allow vibration of the mass along directions substantially perpendicular to the axis of the rotor. The mass and stiffness are chosen so as ensure that the natural flexural frequency of the resulting system is equal to a characteristic frequency of the rotor's rotation, and so the effect of the system is such as to oppose the transmission of vibratory loads generated by the rotor on its plane to the mast.

It follows that the above-described damping device is capable of efficiently opposing the transmission of vibratory loads generated by the rotor on its plane to the mast, the frequency of which is around a precise value determined by the flexural rigidity of the rod and by the weight of the mass.

In other words, the above-described damping device is a "passive" element tuned to a particular frequency value of the vibrations to be dampened.

More precisely, the capacity to dampen the vibrations of the aforesaid damping device drops significantly as soon as the frequency of the aforesaid vibrations moves away from the natural frequency of the device.

A widespread need has arisen within the industry to effectively counter the transmission of vibrations of variable frequency. This is basically due to the introduction of variable-speed rotors in the technical field of helicopters, i.e. rotors having variable speeds of rotation during operation of the helicopter.

Damping devices have been proposed to satisfy this need, for example of the type illustrated in European Patent EP-B-2857313, in the name of the Applicant, which is able to actively vary the vibration frequency to which it is tuned. However, the damping device described in European Patent EP-B-2857313 makes use of centrifugal actuators, rotating in opposite directions to each other and which produce a force directed radially to the rotation axis of the drive shaft.

The use of these centrifugal actuators makes the above-mentioned damping device relatively expensive and complex to manufacture and requires the continuous generation and transmission of significant electric power to the rotor.

Within the industry there is awareness of the need to effectively counter the transmission of vibrations having a variable frequency range by using, as far as possible, damping devices that are simple and inexpensive to build and maintain, and which are characterized as far as possible by a monolithic architecture, i.e. without moving parts, which in an environment subject to very high vibrational stress, would introduce play and therefore wear and undesired damping, as well as problems of fatigue.

EP-A-1528851 discloses a damping device that is designed to impede the transmission of vibrations to a further element.

EP-A-1035015 discloses a method for damping the vibrations transmitted to a drive shaft of a rotor for an aircraft.

DISCLOSURE OF INVENTION

The object of the present invention is to manufacture a damping device that enables meeting the above-mentioned needs in a simple and inexpensive manner.

The aforesaid object is achieved by the present invention in so far as it relates to a damping device that is designed to impede the transmission of vibrations to a further element as described herein.

The present invention also relates to a damping method for the vibrations transmitted to a mast of a rotor for aircraft capable of hovering as described herein.

BRIEF DESCRIPTION OF THE DRAWINGS

For a better understanding of the present invention, four preferred embodiments are be described below, purely by way of a non-limitative example and with reference to the accompanying drawings, in which.

BEST MODE FOR CARRYING OUT THE INVENTION

Figure 1:
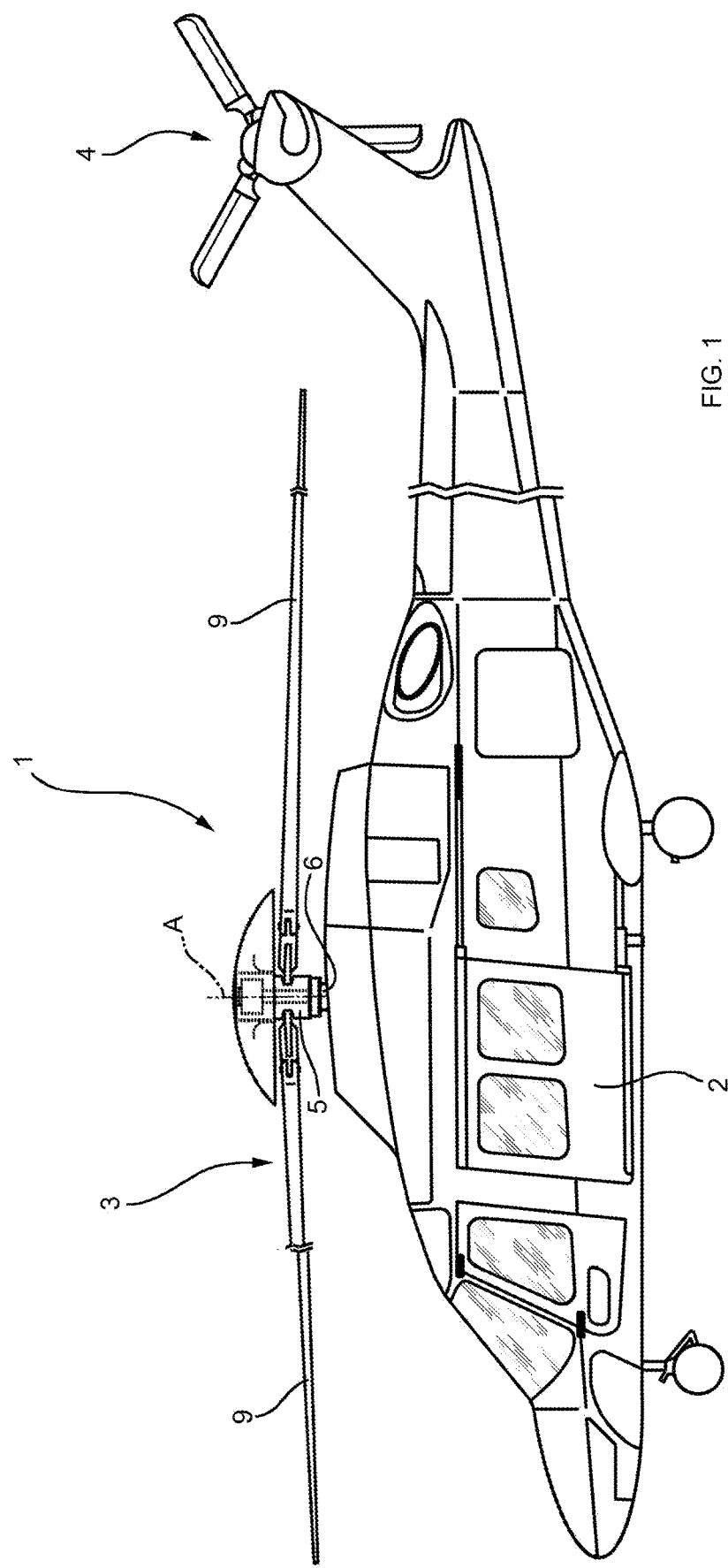
FIG. 1 is a side view of a helicopter with a main rotor comprising a damping device that is made according to the present invention.

Referring to FIG. 1, reference numeral 1 indicates an aircraft capable of hovering, in particular a helicopter, basically comprising a fuselage 2, a main rotor 3 positioned on the top of the fuselage 2 and rotatable about an axis A, and a tail rotor 4 located at the rear end of the fuselage 2 and rotatable about an axis transversal to axis A.

In greater detail, the main rotor 3 comprises a hollow hub 5, centred on axis A and carrying a plurality of cantilever-mounted blades 9, which extend radially to axis A.

The main rotor 3 further comprises a mast 6 rotatable about axis A, angularly integral with the hub 5 and coupled, in a manner not shown, with a drive member, for example a turbine, carried by the helicopter 1. In particular, the mast 6 is hollow.

More precisely (FIG. 2), the mast 6 is partly housed inside the hub 5 and, by means of a splined profile and a ring with a wedge-shaped section interposed between the mast 6 and the hub 5, is angularly integral with the hub 5. In particular, the splined profile is axially interposed between the above-mentioned wedges.

The main rotor 3 also comprises a flow conveyor 10 designed to guide the aerodynamic flow on the rotor, and so reduce aerodynamic resistance and reduce the effect of the wash on the tail rotor.

In greater detail, the flow conveyor 10 is annular, extends around axis A and is located on the opposite side of the hub 5 with respect to the fuselage 2.

The flow conveyor 10 has a "hat-like" shape and is delimited by a two surfaces 11 and 12 axially facing each other; more specifically, surface 11 axially delimits the flow conveyor 10 on the opposite side to the hub 5 while surface 12 axially delimits the flow conveyor 10 on the side closest the hub 5.

Surface 11 is continuous and extends, proceeding in a radial direction starting from axis A, at an axially decreasing distance from the hub 5.

Surface 12 has a first circular peripheral edge 13 and a second peripheral edge (not visible in FIG. 2) opposite to edge 13 and arranged radially outermost to peripheral edge 13. Furthermore, the second peripheral edge of surface 12 axially faces a peripheral edge of surface 11.

The surfaces 11 and 12 are shaped in such a way that that their axial distance decreases when proceeding in a radial direction starting from axis A.

More specifically, surface 12, when proceeding from edge 13 towards the second edge, first moves away from the hub 5 and then moves closer to the hub 5.

The surfaces 11 and 12 are connected to each other by a truncated cone shaped body, symmetrical with respect to axis A and having a lateral surface extending between surfaces 11 and 12.

The main rotor 3 further comprises a vibration damping device 15.

The device 15 advantageously comprises:
  a beam 22 extending parallel to axis A, constrained to the mast 6 and designed to flexurally oscillate, in use, to counter the transmission of vibrations from the blades 9 to the mast 6 and, consequently, to the fuselage 2; and
  an actuator 30, which comprises a rod 32 operatively connected to the beam 22 and extending mainly along axis A, and is controllable to apply a direct tensile or compressive load along axis A on the rod 32 that is variable according to the frequency of the vibrations to be dampened.

In this way, the actuator 30 varies the flexural frequencies of the beam 22 and tunes the device 15 to a variable vibration frequency during operation of the helicopter 1 according to the angular speed of the main rotor 3.

More precisely, if following operation of the actuator 30, the beam 22 is subjected to a tensile load parallel to axis A, the natural flexural frequency of vibration of the beam 22 increases.

Otherwise, if following operation of the actuator 30, the beam 22 is subjected to a compressive load parallel to axis A, the natural flexural frequency of vibration of the beam 22 decreases.

In greater detail, the beam 22 is tubular, symmetrical with respect to axis A and, in the case shown, has a circular cross-section.

The device 15 further comprises:
  a mass 17 operatively connected to the hub 5 and to the mast 6, and free to oscillate in a plane parallel to axis A; and
  a support device 20, which is able to support the mass 17.

The mass 17 is placed at an axial end of the beam 22 and defines, together with the flexural rigidity and the mass of the beam 22, the natural flexural frequency of the beam 22.

In turn, the support device 20 comprises:
  a body 21, which houses the mass 17, is fastened to the mass 17 and is housed inside the flow conveyor 10;
  the beam 22; and
  a tubular body 29, extending mainly along axis A, housed inside and constrained to the mast 6, and housing and constrained to the beam 22.

In the case shown, the body 21 is cylindrical and hollow.

Body 21 comprises a base 25, which lies on plane orthogonal to axis A.

Body 29 has a first axial end connected to a body 14 and placed facing the mass 17, and a second axial end, opposite to the first axial end, and placed facing the motor 31.

In particular, the beam 22 projects in a cantilever manner from the base 25 of the body 21 from the part axially opposite to the mass 17.

In particular, the beam 22 comprises an axial end 23 in common with the body 21 and an axial end 24, opposite to end 23 and fastened to the mast 6.

The beam 22 is partly housed inside the flow conveyor 10 and partly housed inside the mast 6, and passes through an opening in the flow conveyor 10.

Figure 2:
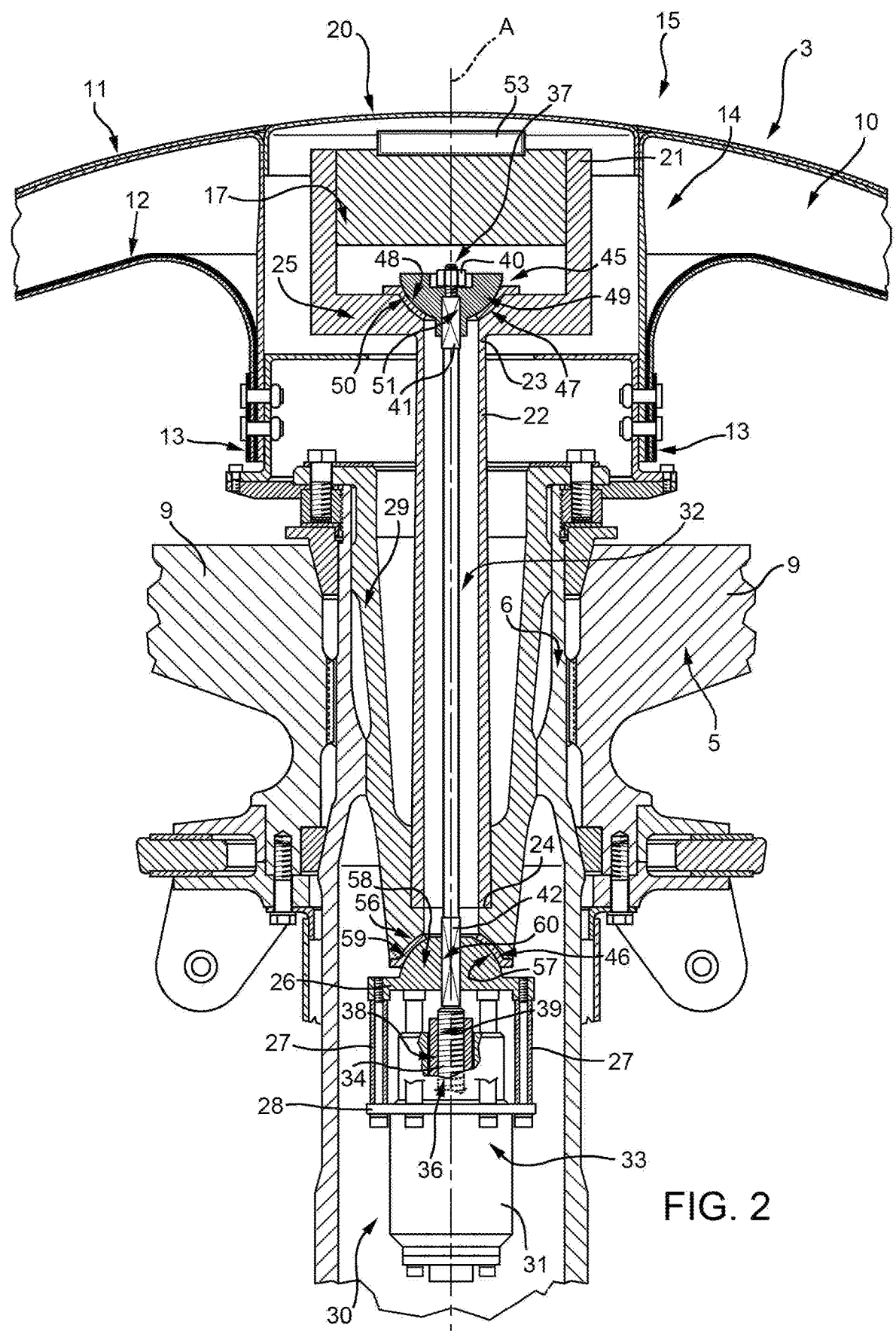
FIG. 2 shows the rotor of the helicopter in FIG. 1 in section and comprising a damping device according to a first embodiment of the present invention, with parts not entirely shown for clarity.

Referring to the embodiment shown in FIG. 2, the actuator 30 basically comprises:

a motor 31, which is controllable to generate torque about axis A; and a rod 32, which is operatively connected to the motor 31 and is subjected to an axial load, tractive in the case shown, following operation of the motor 31.

The motor 31 comprises a frame 33 and an output member 34.

In turn, the frame 33 comprises:
a flange 28 lying on a plane orthogonal to axis A; and
a plurality of columns 27 projecting in a cantilever manner from the flange 28 towards the mass 17 and extending parallel to axis A.

The rod 32 also comprises a pair of axial ends 36 and 37, opposite to each other and located facing the motor 31 and facing the mass 17, respectively.

The rod 32 is partly housed inside the beam 22.

The actuator 30 also comprises a thread 38, a screw in the case shown, carried by the output member 34 of the motor 31, and a thread 39, a female thread in the case shown, coupled to thread 38.

In particular, thread 38 is carried by end 36 of the rod 32.

The motor 31 is preferably of the electrically powered type, by a battery in the case shown.

The output member 34 is preferably connected to the motor 31 via an epicyclic reducer, not shown in detail.

The main rotor 3 further comprises:
a constraining unit 45, which constrains the rod 32 and body 21 to one another; and
a constraining unit 46, which constrains the rod 32 and body 29 to one another.

In greater detail, constraining unit 45 allows relative rotation of the rod 32 and the beam 22 at end 37 of the rod 32.

In the case where an axial load is applied on the rod 32 directed towards the mass 17, i.e. directed upwards in FIG. 2, the constraining unit 45 does not discharge this axial load on body 21 and, therefore, on the beam 22.

Otherwise, in the case where an axial load is applied on the rod 32 directed away from the mass 17, i.e. directed downwards in FIG. 2, the constraining unit 45 discharges this axial load on body 21 and, therefore, on the beam 22. Since the beam 22 is also constrained to body 29, the application of an axial load on the rod 32 directed away from the mass 17 causes a tensile load on the rod 32 and a compressive load on constraining unit 45 and, therefore, on the beam 22.

In turn, constraining unit 45 comprises:
a cup-like element 47, which is hollow, fastened to body 21 and delimited by a concave surface 48 with spherical geometry; and
an element 49, hemispherical in the case shown, which houses end 37 of the rod 32 and is delimited by a surface 50 cooperating with surface 48.

Surfaces 48 and 50 are concentric with respect to axis A and define an articulated joint having a centre on axis A.

In particular, end 37 is threaded and is screwed into a screw cap 40 housed inside element 49.

In turn, constraining unit 46 comprises:
a cup-like element 56, which is hollow, fastened to the mast and delimited by a concave surface 57 with spherical geometry; and
an element 58, hemispherical in the case shown, which is delimited by a surface 59 cooperating with surface 57.

Surfaces 57 and 59 are concentric with respect to axis A and define an articulated joint having a centre on axis A.

Element 58 further comprises a flange 26, which is arranged axially on the side facing the motor 31 and connected to the columns 27.

The rod 32 also comprises:
a prismatic ridge 41, next to end 37 and engaging a prismatic seat 51, which is defined by element 49 of constraining unit 45; and
a prismatic ridge 42, next to end 36 and engaging a prismatic seat 52, which is defined by element 58 of constraining unit 46.

Ridges 41 and 42 are interposed between ends 37 and 36.

Seats 51 and 52 extend along axis A.

Seat 51 also houses, with play radial to axis A, the screw nut 40 and end 37 of the rod 32.

The coupling between the ridges 41 and 42 and the respective seats 51 and 52 prevents rotation of the rod 32 about axis A, due to friction between threads 38 and 39.

Finally, the mass 17 comprises an energy harvester element 53, positioned on the mass 17 and operatively connected to a battery (not shown), which powers the motor 31.

Alternatively, the harvester 53 could be integrated in the mass 17.

In use, the mast 6 drives the hub 5 and the blades 9 in rotation about axis A and is connected, via body 29, to the device 15.

More precisely, the mast 6 can rotate about axis A with variable angular speed.

The rotation of the hub 5 and the blades 9 generates vibrations, which are transmitted to the mast 6 and, from there, to the fuselage 2 of the helicopter 1.

According to the rotational speed of the mast 6, the actuator 30 tunes the natural flexural frequency of the device 15 on a multiple N of the rotation frequency associated with the angular speed of the mast 6, where N is the number of blades of the rotor.

More precisely, the motor 31 drives the output member 34 in rotation about axis A, causing, via the coupling between threads 38 and 39, a force on the rod 32 directed away from the mass 17, i.e. downwards with reference to FIG. 2.

Due to the fact that constraining unit 45 prevents relative movement of the rod 32 with respect to body 21 from the end facing the mass 17, this force exerted by the motor 31 causes a tensile load on the rod 32.

The force exerted by the motor 31 on the rod 32 also causes a compressive load on the support device 20 and, therefore, on the beam 22. This is due to the fact that the beam 22 of the support device 20 is axially interposed between constraining unit 45 and body 21 and is constrained to the mast 6.

This compressive load alters the natural flexural oscillation frequency of the beam 22 and makes it coincide with the frequency of the vibration generated by the rotor, i.e. the vibration that it is wished to counter.

More precisely, the higher the compressive load acting on the beam 22, the lower the flexural oscillation frequency of the beam 22 and, consequently, the tuning frequency of the device 15.

The coupling between the surfaces 48 and 50 of constraining unit 45 defines an articulated joint having its centre on axis A. This articulated joint enables flexure of the rod 32 with respect to body 21 and to the beam 22 in a plane parallel to axis A.

Similarly, the coupling between the surfaces 57 and 59 of constraining unit 46 defines a further articulated joint having its centre on axis A. This further articulated joint enables flexure of the rod 32 with respect to the mast 6 in a plane parallel to axis A.

Figure 3:
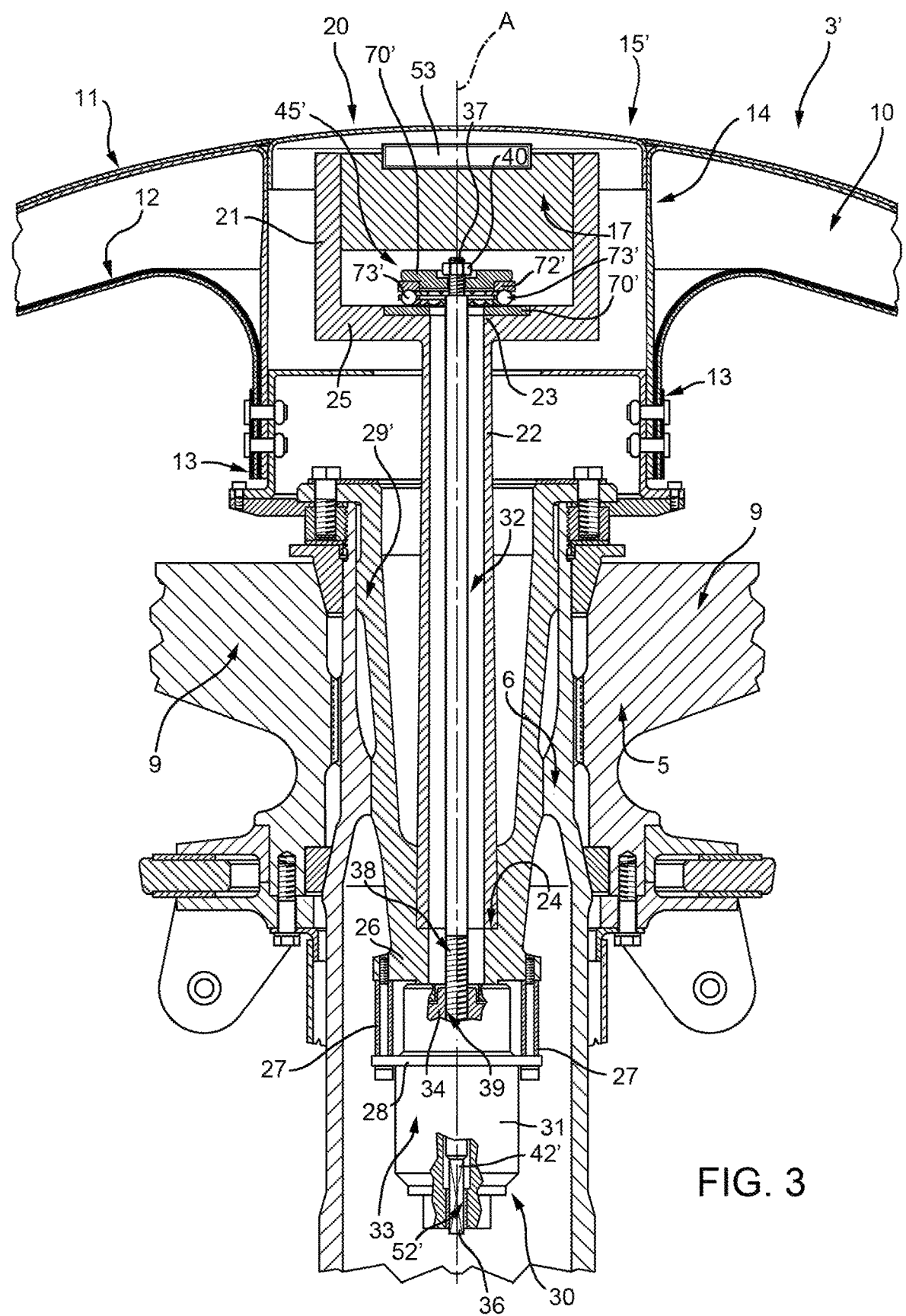
FIG. 3 shows the rotor in FIG. 1 in section and comprising a damping device according to a second embodiment of the present invention, with parts not entirely shown for clarity.

Referring to FIG. 3, reference numeral 15' indicates a damping device according to a second embodiment of the present invention and, preferably, applied to a main rotor 3'.

Device 15' is similar to device 15 and shall be described below only regarding its differences with respect to the latter; where possible, the same or equivalent parts of devices 15 and 15' shall be indicated with the same reference numerals.

In particular, device 15' differs from device 15 in that constraining unit 45' is formed by:
- a ring 70' centred on axis A and constrained to the base 25 of the body 21;
- a flange 71' centred on axis A and constrained to end 37 of the rod 32;
- a ring 72', which is housed in an annular shoulder of flange 71'; and
- a plurality of rolling bodies 73', spherical in the case shown, which are arranged circumferentially around axis A and roll on flange 71' and on ring 72'.

It is important to underline that constraining unit 45' enables flexure of the beam 22 in a plane parallel to axis A without causing flexure of the rod 32. This enables making the load acting on the beam 22 always substantially parallel to axis A and to consequently maximize the effect on the natural frequency of oscillation of the beam 22.

Furthermore, when the motor 31 exerts a force on the rod 32 directed away from the mass 17, i.e. downwards with reference to FIG. 2, ring 70' and flange 71' press ring 72' via the rolling bodies 73' and, therefore, body 21 and the beam 22.

It follows that constraining unit 45' transforms a tensile load on the rod 32 into a compressive load on the beam 22, correspondingly altering the flexural oscillation frequency of the beam 22.

This particular configuration has the aim of making the compressive load always vertical and non-oscillating, as implemented in the previously illustrated device 15, which maximizes the effect of altering the frequency of the beam 22.

In addition, device 15' differs from device 15 in that it does not include constraining unit 46.

Body 29' differs from body 29 in that it carries flange 26 at its axial end placed facing the motor 31.

Ridge 42' differs from ridge 42 in that it is defined by end 36 of the rod 32 and is housed in a seat 52' defined by the frame 33 of the motor 31.

Operation of device 15" is entirely similar to that of device 15 and is therefore not described in detail.

Figure 4:
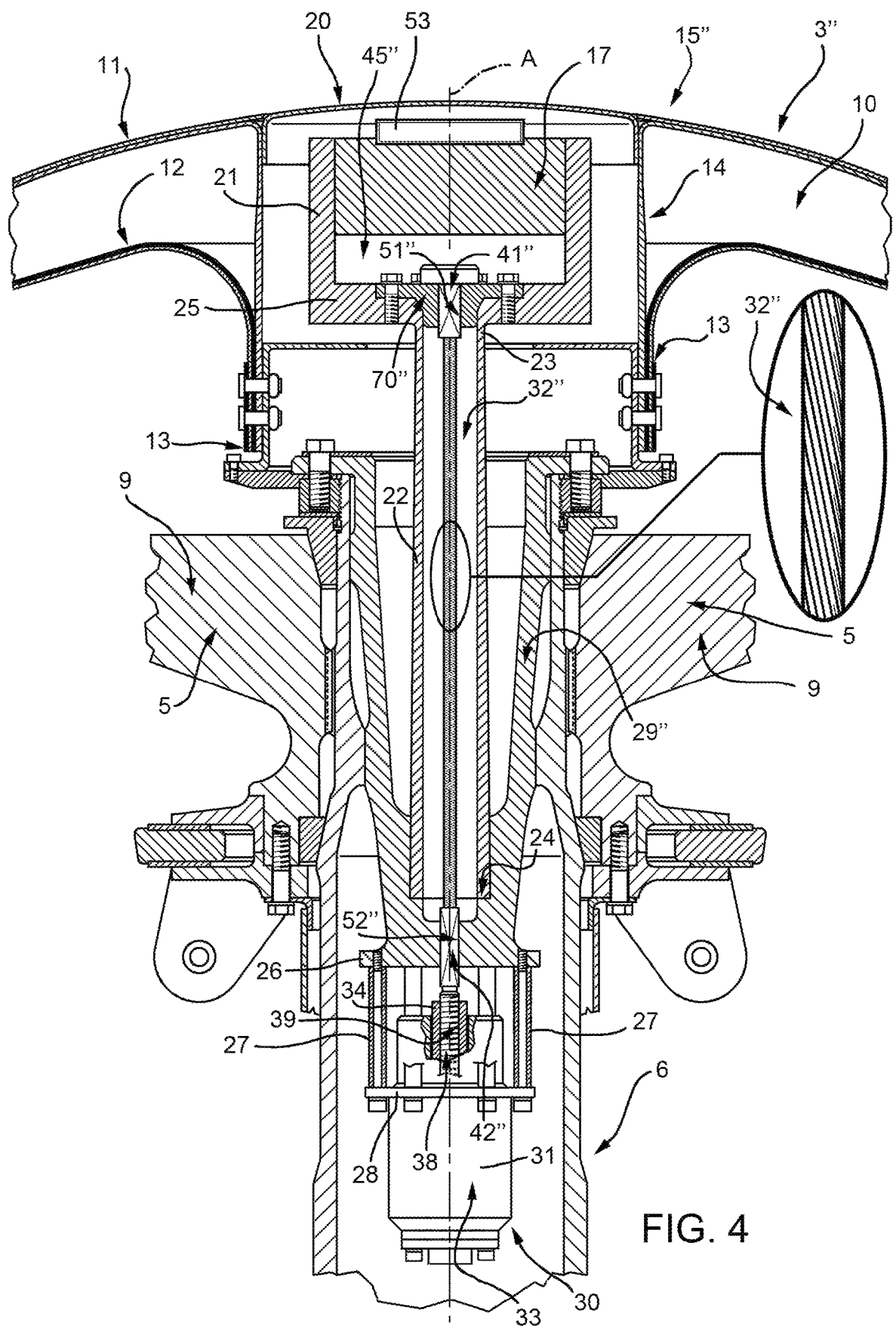
FIG. 4 shows the rotor in FIG. 1 in section and comprising a damping device according to a third embodiment of the present invention, with parts not entirely shown for clarity.

Referring to FIG. 4, reference numeral 15" indicates a device according to a third embodiment of the present invention and, preferably, applied to a main rotor 3".

Device 15" is similar to device 15 and shall be described below only regarding its differences with respect to the latter; where possible, the same or equivalent parts of devices 15 and 15" shall be indicated with the same reference numerals.

In particular, device 15" differs from device 15 in that instead of the rod 32, it comprises an element 32" made of a flexible material, for example a steel or high-resistance carbon fibre cable.

Body 29" differs from body 29 in that it carries flange 26 at its axial end placed facing the motor 31.

The cable 32" also comprises a ridge 42" located next to thread 39 and engaging a seat 52" defined by flange 26 of body 29".

Constraining unit 45" differs from constraining unit 45 in that it comprises a flange 70", which is bolted to body 21 and defines a pass-through seat 51" for ridge 41" of the cable 32".

Device 15" also differs from device 15 in that it does not include constraining unit 46.

Operation of device 15" is entirely similar to that of device and only the operating differences from device 15 are described.

In particular, operation of device 15" differs from operation of device 15 in that operation of the motor 31 causes a tensile load on the cable 32" and in that flange 70" transforms the tensile state of the cable 32" into a compressive state of the beam 22, thus altering the natural flexural oscillation frequency of the latter and tuning device on the correct dampening frequency associated with the rotational speed of the mast 6.

In particular, device 15" could comprise a cable 32" much longer than the beam 22, with an actuator unit 31 and flange 26 positioned lower down inside the mast of the rotor. This would make the load exerted on the beam 22 substantially parallel to axis A and would make the effect of altering the natural frequency of the beam 22 more efficient.

Figure 5:
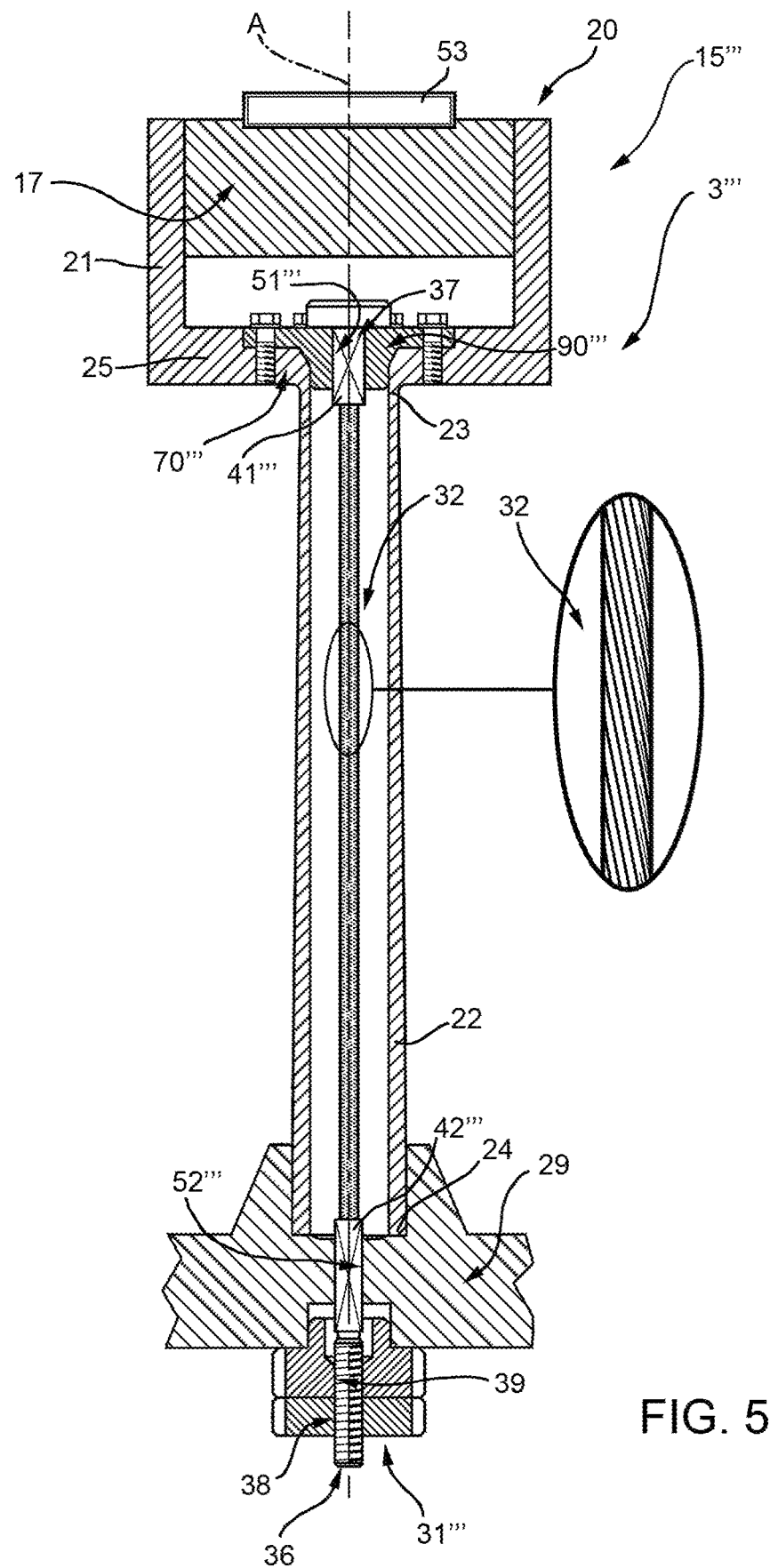
FIG. 5 shows the rotor in FIG. 1 in section and comprising a damping device according to a fourth embodiment of the present invention, with parts not entirely shown for clarity.

Referring to FIG. 5, reference numeral 15''' indicates a device according to a fourth embodiment of the present invention and, preferably, applied to a main rotor 3.

Device 15''' is similar to device 15 and shall be described below only regarding its differences with respect to the latter; where possible, the same or equivalent parts of devices 15 and 15''' shall be indicated with the same reference numerals.

In particular, device 15''' differs from device 15 in that instead of the motor 31, it comprises a ring nut 31''', internally threaded along axis A and coupled to thread 39 integral with the cable 32'''.

Operation of device 15''' is entirely similar to that of device 15" and only the operating differences from device 15" are described.

In particular, operation of device 15''' differs from operation of device 15" in that the cable 32''' is placed in traction by manually operating the ring nut 31'''.

From examination of the device 15, 15', 15", 15''' according to the present invention, the advantages that can be achieved therewith are evident.

In particular, the device 15, 15', 15", 15''' comprises an actuator 30, which is operatively connected to the beam 22 and can be operated to apply a variable load on the beam 22 along axis A.

In this way, the actuator 30 enables altering the flexural oscillation frequency of the beam 22 and, consequently, tuning the device 15, 15', 15", 15''' to a variable rotation frequency of the mast 6. In this way, the actuator 30 enables countering the transmission of a range of frequencies from the mast 6 to the fuselage 2. This is particularly advantageous when the device 15, 15', 15", 15''' is applied to helicopters equipped with rotors 3, 3', 3", 3''' having a variable rotational speed.

In particular, if the actuator 30 applies a tensile load on the rod 32, the natural flexural oscillation frequency of the beam 22 is reduced with respect the natural flexural oscillation frequency in the absence of axial load on the rod 32.

It is important to underline that the actuator 30 enables altering the natural flexural oscillation frequency of the beam 22 in a manner particularly simple and inexpensive to manufacture and maintain, and without requiring the use of contra-rotating centrifugal actuators as in the solutions of known type described in the introductory part of the present description.

The actuator 30 preferably causes a compressive load on the support device 20 and on the mass 17. This is due to the fact that, on one hand, the support device 20, and therefore the beam 22, is constrained to the mast 6 and, on the other, that the constraining unit 45, 45' prevents relative movement between the support device 20 and the rod 32 along axis A and towards the motor 31.

This enables lengthening the fatigue life of the beam 22.

The constraining unit 45 allows relative rotation of the rod 32 and the beam 22 at end 37 of the rod 32.

This is achieved thanks to the articulated joint between surfaces 48 and 50.

The constraining unit 45' allows flexure of the beam 22 with respect to the rod 32 without relative interference at end 37 of the rod 32.

This is achieved by the rolling bodies 73'. In fact, the rolling bodies 73' allow movement, in a plane orthogonal to the axis A, of ring 71' and of flange 72' integral with the rod 32 with respect to ring 70' integral with body 21.

The rod 32 and the cable 32", 32''' are housed inside the mast 6, thus reducing the overall dimensions of the main rotor 3, 3', 3", 3'''.

Finally, it is clear that modifications and variants may be made to the device 15, 15', 15", 15''' described and illustrated herein without departing from the scope defined in the claims.

In particular, the device 15, 15', 15", 15''' might not be applied to a helicopter 1, but to any other apparatus, for example a machine tool, a boat or land vehicle, having a source of vibration and a portion that it is wished insulate from this source of vibration.

In addition, the device 15, 15', 15", 15''' could be applied to other parts of the helicopter 1, for example on the floor platform of the fuselage 2, in order to counter the transmission of vibrations to the fuselage 2.

The mass 17 and the support device 15 could be manufactured as a single piece.

The main rotor 3, 3', 3", 3''' could be applied to a convertiplane instead of a helicopter 1.

The actuator 30 could cause a tensile instead of compressive load on the mass 17. This would require opportunely constraining the mass 17 to the mast 6 and to the rod 32 or cable 32", 32'''.

In addition, constraining unit 45, 45' could:
prevent relative movement between the rod 32 and the support device 20 in both directions parallel to axis A; or
prevent movement of the support device 20 relative to the rod 32 only in the direction of the mass 17, i.e. upwards in FIGS. 2 and 3.

The invention claimed is:

1. A damping device (15, 15', 15", 15''') designed to impede a transmission of vibrations to a further element (6), comprising:
an oscillating beam element (22), which extends mainly parallel to an axis (A), is constrained to said further element (6) and is designed to flexurally oscillate in a plane parallel to said axis (A) to counter the transmission of vibrations to said further element (6);
an actuator (30), which comprises a transmission element (32, 32", 32''') operatively connected to said beam element (22) and extending mainly along said axis (A);
said actuator (30) being controllable to apply a direct tensile or compressive load along said axis (A) on said transmission element (32, 32", 32''') that is variable according to a frequency of the vibrations to be dampened;
characterized in that said beam element (22) is tubular and in that said transmission element (32, 32", 32''') is partly housed inside said beam element (22);
said damping device (15, 15', 15", 15''') further comprising a mass (17) operatively connected to said beam element (22) and arranged at an axial end of said beam element (22);
said actuator (30) comprising:
an actuating member (31, 31'''), which can be operated to exert torque having a main component coaxial to said axis (A); and
connecting means (38, 39) interposed between said actuating member (31, 31''') and said transmission element (32, 32") and configured to transform said torque generated by said actuating member (31, 31''') in said load acting on said transmission element (32, 32").

2. The damping device according to claim 1, characterized in that said damping device further comprises an upper constraining unit (45, 45', 45"), which constrains said transmission element (32) and said mass (17) at least in a first direction parallel to said axis (A).

3. The damping device according to claim 2, characterized in that said upper constraining unit (45, 45') is configured to leave said beam element (22) and transmission element (32) free to rotate with respect to each other, or to allow said beam element (22) to flex with respect to said transmission element (32) in a plane parallel to said axis (A).

4. The damping device according to claim 2, characterized in that said upper constraining unit (45, 45') constrains said transmission element (32) and said beam element (22) to one another only in said first direction, parallel to said axis (A), and is configured so as to leave said transmission element (32) and said beam element (22) free to move with respect to each other in a second direction, opposite to said first direction and parallel to said axis (A).

5. The damping device according to claim 2, characterized in that said upper constraining unit (45) comprises:
a first body (49), which comprises a first surface (50) at least partially spherical and integral with said transmission element (32); and
a second body (47), which comprises a second surface (48) at least partially spherical and integral with said beam element (22);
said first surface and second surface (50, 48) having a common centre on said axis (A) and being free to rotate with respect to each other about said centre.

6. The damping device according to claim 2, characterized in that said upper constraining unit (45') comprises:
a first ring (72'), which is integral with said transmission element (32);
a second ring (70'), which is integral with said beam element (22); and
a plurality of rolling bodies (73'), interposed between said first ring and second ring (72', 70') on said axis (A) and designed to allow movement of said first ring (72') with respect to said second body (70') in a plane parallel to said axis (A);
said first ring (72') being arranged on an axially opposite side to said second ring (70') with respect to said rolling bodies (73'), and said first ring (72') being free to move on the opposite side of said rolling bodies (73') along said axis (A).

7. The damping device according to claim 2, further including a support device (20), which supports said beam element (22) and is axially fixed to a translation with respect to said axis (A);

said support device (20) comprising:
- a first portion (21) cooperating with said upper constraining unit (45, 45'); and
- a second portion (22) fixed to said further element (6) and defining said beam element (22);
- said first portion (21) being axially interposed between said second portion (22) and said upper constraining unit (45, 45', 45") so that said beam element (22) is subjected to a compressive state when said transmission element (32, 32") is subjected to a tensile state.

8. The damping device according to claim 1, characterized in that said actuating member (31, 31''') is a motor (31) or a manually operable ring nut (31''').

9. The damping device according to claim 1, characterized in that said beam element (22) coaxially houses said transmission element (32, 32").

10. The damping device according to claim 1, characterized in that said transmission element (32, 32") is a rod (32) with flexural rigidity or a flexible element (32").

11. A rotor (3, 3', 3", 3''') for an aircraft (1) capable of hovering, comprising:
- the vibration damping device (15) according to claim 1;
- a hub (5) rotatable about said axis (A) and comprising a plurality of blades (9);
- a mast (6) connectable to a drive member of said aircraft (1) and operatively connected to said hub (5) to drive the hub (5) in rotation about said axis (A); and
- wherein said vibration damping device (15) is designed to counter the transmission of vibrations to said mast (6), wherein said further element (6) of said vibration damping device (15) is mast (6).

12. The rotor according to claim 11, characterized in that said vibration damping device (15) further comprises a lower constraining unit (46), which is designed to be interposed between said mast (6) and said transmission element (32); said lower constraining unit (46) constraining said transmission element (32) and said mast (6) to one another at least in one direction parallel to said axis (A), and being configured to allow relative rotation between said transmission element (32) and said mast (6).

13. A method for damping vibrations transmitted to a drive shaft (6) of a rotor (3, 3', 3", 3''') by means of a damping device (15, 15', 15", 15''') for an aircraft capable of hovering, comprising the steps of:
- i) driving a hub (5) comprising a plurality of blades (9) in rotation about an axis (A);
- ii) operatively connecting said drive shaft (6) to said hub (5) and to a drive member of said aircraft (1); and
- iii) making a beam element (22) of said damping device (15, 15', 15", 15''') flexurally oscillate in a plane parallel to said axis (A), so as to oppose the transmission of said vibrations generated by the rotation of said blades (9) to said drive shaft (6);

characterized in that said step iii) comprises step iv) of applying, by means of an actuator (30) of said damping device (15, 15', 15", 15'''), a direct tensile or compressive load directed along said axis (A) on a transmission element (32, 32", 32''') of said damping device (15, 15', 15", 15''') that is variable according to a frequency of the vibrations to be dampened;

said beam element (22) being tubular and said transmission element (32, 32", 32''') being partly housed inside said beam element (22);

said damping device (15, 15', 15", 15''') further comprising a mass (17) operatively connected to said beam element (22) and arranged at an axial end of said beam element (22);

said actuator (30) comprising:
- an actuating member (31, 31'''), which can be operated to exert torque having a main component coaxial to said axis (A); and
- connecting means (38, 39) interposed between said actuating member (31, 31''') and said transmission element (32, 32") and configured to transform said torque generated by said actuating member (31, 31''') in said load acting on said transmission element (32, 32").

* * * * *